United States Patent
McKenney

(10) Patent No.: US 9,519,307 B2
(45) Date of Patent: Dec. 13, 2016

(54) DETECTING FULL-SYSTEM IDLE STATE IN ADAPTIVE-TICK KERNELS

(71) Applicant: GLOBALFOUNDRIES INC., Grand Cayman (KY)

(72) Inventor: Paul E. McKenney, Beaverton, OR (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 251 days.

(21) Appl. No.: 14/310,097

(22) Filed: Jun. 20, 2014

(65) Prior Publication Data

US 2014/0380084 A1 Dec. 25, 2014

Related U.S. Application Data

(60) Provisional application No. 61/837,276, filed on Jun. 20, 2013.

(51) Int. Cl.
*G06F 1/14* (2006.01)
*G06F 1/32* (2006.01)

(52) U.S. Cl.
CPC .............. *G06F 1/14* (2013.01); *G06F 1/3206* (2013.01); *G06F 1/3237* (2013.01); *Y02B 60/1221* (2013.01); *Y02B 60/32* (2013.01)

(58) Field of Classification Search
CPC ........ G06F 1/14; G06F 1/3206; G06F 1/3237; Y02B 60/1221; Y02B 60/32
See application file for complete search history.

(56) References Cited

U.S. PATENT DOCUMENTS

| 4,858,147 A | * | 8/1989 | Conwell | G06N 3/10 700/48 |
|---|---|---|---|---|
| 8,055,918 B2 | | 11/2011 | McKenney et al. | |
| 8,108,696 B2 | | 1/2012 | Triplett | |
| 8,327,187 B1 | | 12/2012 | Metcalf | |
| 8,407,503 B2 | | 3/2013 | McKenney | |

(Continued)

OTHER PUBLICATIONS

Corbet, Jonathan, "(Nearly) Full Tickless operation in 3.10" May 8, 2013, Internet: https://lwn.net/Articles/549580/ p. 1-8.*

(Continued)

*Primary Examiner* — Thomas Lee
*Assistant Examiner* — Chad Erdman
(74) *Attorney, Agent, or Firm* — Thompson Hine LLP

(57) ABSTRACT

A technique for detecting full-system idle state in an adaptive-tick kernel includes detecting non-timekeeping CPU idle state, initiating a hysteresis period, waiting for the hysteresis period to end, manipulating a data structure whose state indicates whether a scheduling clock tick may be disabled on all CPUs, and disabling the scheduling clock tick if the data structure is in an appropriate state. In a first embodiment, non-timekeeping CPUs manipulate a global counter when entering an idle state, but add hysteresis to avoid thrashing the counter. Timekeeping is turned off based on the count maintained on the global counter. In a second embodiment, a Read-Copy Update (RCU) dynticks-idle subsystem running on a timekeeping CPU manipulates a global state variable whose states indicate whether all non-timekeeping CPUs are in an idle state, and if so, for how long. Timekeeping is turned off based on the state of the global state variable.

15 Claims, 6 Drawing Sheets

(56) References Cited

U.S. PATENT DOCUMENTS

| | | | |
|---|---|---|---|
| 8,612,786 B1 | 12/2013 | Lachwani et al. | |
| 2006/0053326 A1* | 3/2006 | Naveh | G06F 1/3203 713/323 |
| 2012/0102344 A1* | 4/2012 | Kocev | G06F 1/3237 713/322 |
| 2013/0061071 A1 | 3/2013 | McKenney | |
| 2014/0006820 A1 | 1/2014 | McKenney | |
| 2014/0380070 A1* | 12/2014 | Hua | G06F 1/26 713/320 |

OTHER PUBLICATIONS

P. McKenney, "Bare-Metal Multicore Performance in a General-Purpose Operating System", Linux Plumbers Conference, Sep. 18, 2013, 49 pages.

P. McKenney, "CPU Hotplug, RCU, and big.LITTLE", Nov. 1, 2012, 33 pages.

P. McKenney, "Getting RCU Further Out of the Way", Aug. 31, 2012, 31 pages.

P. McKenney, "Making RCU Safe for Battery-Powered Devices" Dec. 15, 2012, 66 pages.

P. McKenney et al., Integrating and Validating dynticks and Preemptible RCU, <http://lwn.net/Articles/2790771>, Apr. 22, 2008, pp. 1-19.

T. Gleixner, "high resolution timers/dynamic ticks—V2", <http://lwn.net/Articles/2023191>, Oct. 1, 2006, pp. 1-5.

J. Edge, "The 2012 realtime minsummit", <http://lwn.net/Articles/520704/>, Oct. 24, 2012, pp. 1-6.

P. Mann et al., "Handling os jitter on multicore multi-threaded systems", Parallel and Distributed Processing Symposium, International, 0:1-12, 2009, 12 pages.

P. McKenney, "The new visibility of RCU processing", <http://lwn.net/Articles/518953/>, Oct. 10, 2012, pp. 1-3.

J. Triplett, "BOF: Painless kernel—Removing the HZ", Linux Plumbers Conference, Sep. 23, 2009, 7 pages.

\* cited by examiner

DETECTING FULL-SYSTEM IDLE STATE IN ADAPTIVE-TICK KERNELS

BACKGROUND

1. Field

The present disclosure relates to computer systems and methods. More particularly, the disclosure the pertains to processor scheduling mechanisms.

2. Description of the Prior Art

By way of background, Scheduling clock interrupts have long been used in operating systems to implement time slicing, preventing a CPU-bound process from starving other processes. However, scheduling-clock interrupts are not free, particularly when running real-time applications or high-performance-computing (HPC) applications. For these types of applications, OS jitter resulting from the scheduling-clock interrupts can greatly degrade performance, resulting in considerable efforts to reduce OS jitter. The Linux® community has been working to address this problem by removing scheduling-clock interrupts.

This work checks state when a given CPU exits from the kernel to userspace execution. If there is only one runnable task on this CPU, the kernel turns off the scheduling-clock tick and also informs any kernel subsystems that need to know about this, including RCU (Read-Copy Update). RCU handles a CPU running in userspace without a scheduling-clock tick in the same way that it handles a CPU that is idle without a scheduling-clock tick. RCU continues to track the number of reasons that each CPU is non-idle, as discussed in Section 2.1 below, using an integer whose value is zero when the corresponding CPU is idle.

However, one challenge is the general-purpose nature of the Linux® kernel, which requires that timekeeping be maintained whenever at least one CPU is running either non-idle-loop kernel code or user-mode code. The variant of adaptive ticks in the Linux® kernel handles this need by keeping the scheduling-clock interrupt turned on for at least one CPU (designated the timekeeping CPU) at all times. This works well because this CPU can be designated a housekeeping CPU on which the OS-jitter-sensitive application never runs.

Unfortunately, this approach prevents all CPUs from going idle for extended periods, because one of the CPUs will continue to receive scheduling-clock interrupts. This situation needlessly wastes energy, so an improved approach would be quite useful.

There are a number of straightforward approaches, each with equally straightforward drawbacks:

1. Maintain a global count of the number of non-idle CPUs, shutting off the time-keeping CPU's scheduling-clock interrupt when all CPUs are idle. This works well for small systems, but results in scalability problems for large systems due to excessive memory contention on the variable containing the global count, especially for workloads that cause large numbers of CPUs to enter and exit idle extremely frequently. This approach also requires careful coordination with the CPU hotplug system.

2. Run a small computational kernel on the non-housekeeping CPUs. This is the approach used by many commercial HPC systems, including those from IBM and Cray, but it has the drawback of severely constraining the application's design. These constraints are due to the need to communicate to special I/O nodes to handle normal system calls, and the inability of computational kernels to support more than one thread per CPU.

3. Within the Linux® kernel, take the non-housekeeping CPUs offline and run the application on these "offline" CPUs within the context of the Linux® kernel. This is a variant of the computational-kernel approach, and suffers all the drawbacks of that approach, but also requires the difficult task of debugging within the unforgiving Linux® kernel software environment. This approach also voids the warranty provided by most organizations providing commercial support for the Linux® kernel.

What is needed is an approach that allows the scheduling-clock interrupt to be shut down when a given CPU is executing user-mode code, but which also allows all CPUs to simultaneously dispense with scheduling-clock interrupts when the system is fully idle, that performs and scales well (even on systems with thousands of CPUs), and does not entail the application restrictions required by the various computational-kernel approaches.

SUMMARY

A method, system and computer program product are provided to implement a technique for detecting full-system idle state in an adaptive-tick kernel. The technique comprises detecting a non-timekeeping CPU idle state, initiating a hysteresis period, waiting for the hysteresis period to end, manipulating a data structure whose state indicates whether a scheduling clock tick may be disabled on all of the CPUs, and disabling the scheduling clock tick on all of the CPUs if the data structure is determined to be in an appropriate state.

In a first example embodiment, the detecting a non-timekeeping CPU idle state comprises each non-timekeeping CPU detecting it is ready to enter an idle state. The initiating a hysteresis period comprises each non-timekeeping CPU setting a timer, then entering the idle state. The waiting for the hysteresis period to end comprises each non-timekeeping CPU remaining in the idle state until it is awakened by the timer. The manipulating a data structure comprises each non-timekeeping CPU decrementing a global counter if it remained in the idle state for the hysteresis period, then returning to the idle state indefinitely. The disabling of the scheduling clock tick on all of the CPUs is performed by the timekeeping CPU based on the global counter having been decremented to a predetermined value indicating that all of the non-timekeeping CPUs have remained in the idle state for at least the hysteresis period.

In a second example embodiment, the detecting a non-timekeeping CPU idle state comprises the timekeeping CPU detecting that all the non-timekeeping CPUs are in an idle state. The initiating a hysteresis period and the waiting for the hysteresis period end use a global state variable that indicates whether or not all of the non-timekeeping CPUs are in an idle state, and if so, for how long. The global state variable is configured to store a first state indicating that at least one non-timekeeping CPU is in a non-idle state, a second state indicating that all of the non-timekeeping CPUs have been in an idle state for a relatively short time period, a third state indicating that all of the non-timekeeping CPUs have been in an idle state long enough that the global state variable may be changed without danger of excessive memory contention, a fourth state indicating that all of the non-timekeeping CPUs have been in an idle state long enough to warrant turning off the scheduling clock tick, and a fifth state indicating that the timekeeping CPU has noted the fourth state and turned off the scheduling clock tick on all of the CPUs.

The initiating a hysteresis period comprises first and second hysteresis initiating operations, and the waiting for the hysteresis period to end comprises first and second hysteresis period waiting operations. The first hysteresis initiating operation comprises the timekeeping CPU transitioning the global state variable from the first state to the second state, and performing a calculation to determine a first delay period for transition of the global state variable from the second state to the third state. The first hysteresis period waiting operation comprises the timekeeping CPU waiting until the first delay period has elapsed. The second hysteresis initiating operation comprises the timekeeping CPU transitioning the global state variable from the second state to the third second state, and performing a calculation to determine a second delay period for transition of the global state variable from the third state to the fourth state. The second hysteresis period waiting operation comprises the timekeeping CPU waiting until the second delay period has elapsed.

The manipulating a data structure comprises said timekeeping CPU transitioning the global state variable from the third state to the fourth state after the second the delay period has elapsed. The disabling of the scheduling clock tick on all of the CPUs is performed by the timekeeping CPU based on the global state variable being in the fourth state, and includes the timekeeping CPU transitioning the global state variable from the fourth state to the fifth state, then disabling the scheduling clock tick.

In the second example embodiment, the global state variable is maintained as part of a Read-Copy Update (RCU) dyntick-idle subsystem, and state transitions of the global state variable between the first state, the second state and the third state are performed by an RCU grace period tracking kthread running on the timekeeping CPU.

In the second example embodiment, the non-timekeeping CPUs record their entry into idle state using a per-CPU idle state variable, and the RCU dyntick-idle subsystem checks the per-CPU idle state variables and transitions the global state variable from the first state to the second state if each non-timekeeping CPU has set its per-CPU idle state variable to indicate the idle state.

In the second example embodiment, the calculations to determine the first and second delay periods are based on the number of CPUs, and if that number exceeds a threshold, a rate of the scheduling clock tick and an RCU leaf fanout size.

In the second example embodiment, the scheduling clock tick is restored by one of the non-timekeeping CPUs awakening out of its idle state, checking the global state variable, transitioning the global state variable to the first state if it is in any of the third through fifth states, and sending an inter-processor interrupt to the timekeeping CPU if the global state variable is in the fifth state.

BRIEF DESCRIPTION OF THE DRAWINGS

The foregoing and other features and advantages will be apparent from the following more particular description of example embodiments, as illustrated in the accompanying Drawings, in which.

DETAILED DESCRIPTION OF EXAMPLE EMBODIMENTS

Detecting Full-System Idle State in Adaptive-Ticks Kernels—Introduction

The idle-state detection technique disclosed herein provides a mechanism by which the scheduling-clock interrupt in a computer system can be shut down when a given CPU in the system is executing user-mode code, but also allows all CPUs to simultaneously dispense with scheduling-clock interrupts when the system is fully idle. The solution allows larger systems to take more time to move to idle state, thus maintaining memory contention on the global state variables at an acceptably low level.

Figure 1:
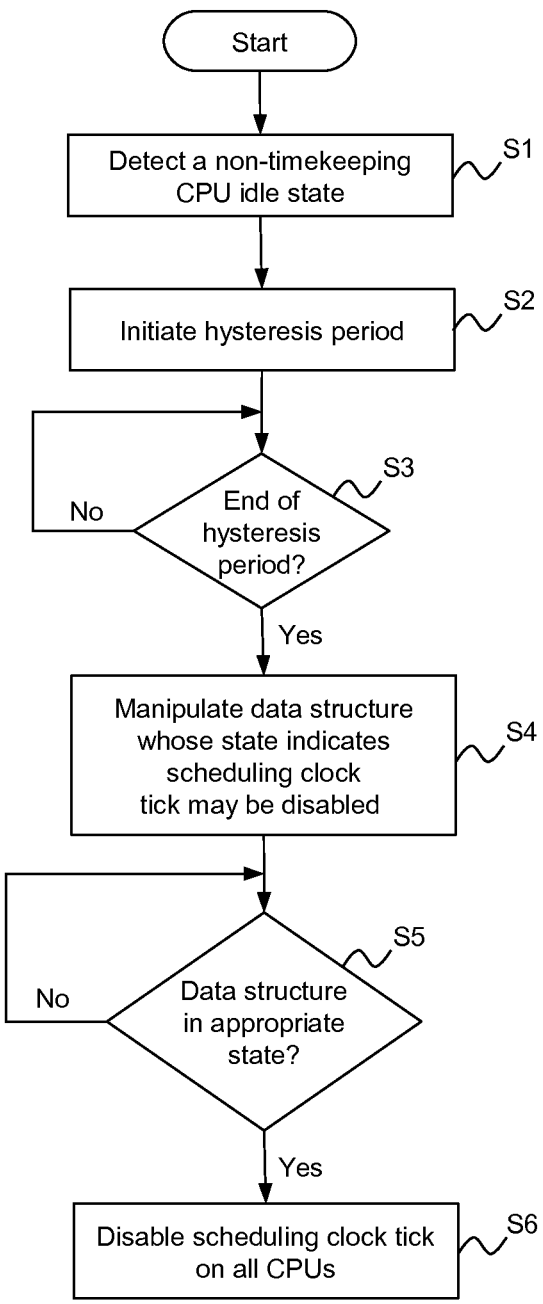
FIG. 1 is a flow diagram showing a general technique for detecting full-system idle state in an adaptive-tick kernel.

FIG. 1 illustrates the general approach. Block S1 represents a first operation comprising detecting a non-timekeeping CPU idle state. Block S2 represents a second operation comprising initiating a hysteresis period. Block S3 represents a third operation comprising waiting for the hysteresis period to end. Block S4 represents a fourth operation comprising manipulating a data structure whose state indicates whether a scheduling clock tick may be disabled on all of the CPUs. Blocks S5 and S6 represent a fifth operation comprising disabling the scheduling clock tick on all of the CPUs if the data structure is determined to be in an appropriate state.

One way of implementing the general approach of FIG. 1 would be to continue to maintain a global count of the number of non-idle CPUs, but to add hysteresis to avoid thrashing this counter. The idea is that a CPU going idle sets a timer for a small time period. If this CPU has remained idle for the full time period until the timer goes off, then and only then does that CPU decrement the global variable counting the number of non-idle CPUs. Of course, when the CPU goes non-idle, it increments the counter if and only if it decremented it during the just-ended idle period.

Figure 2:
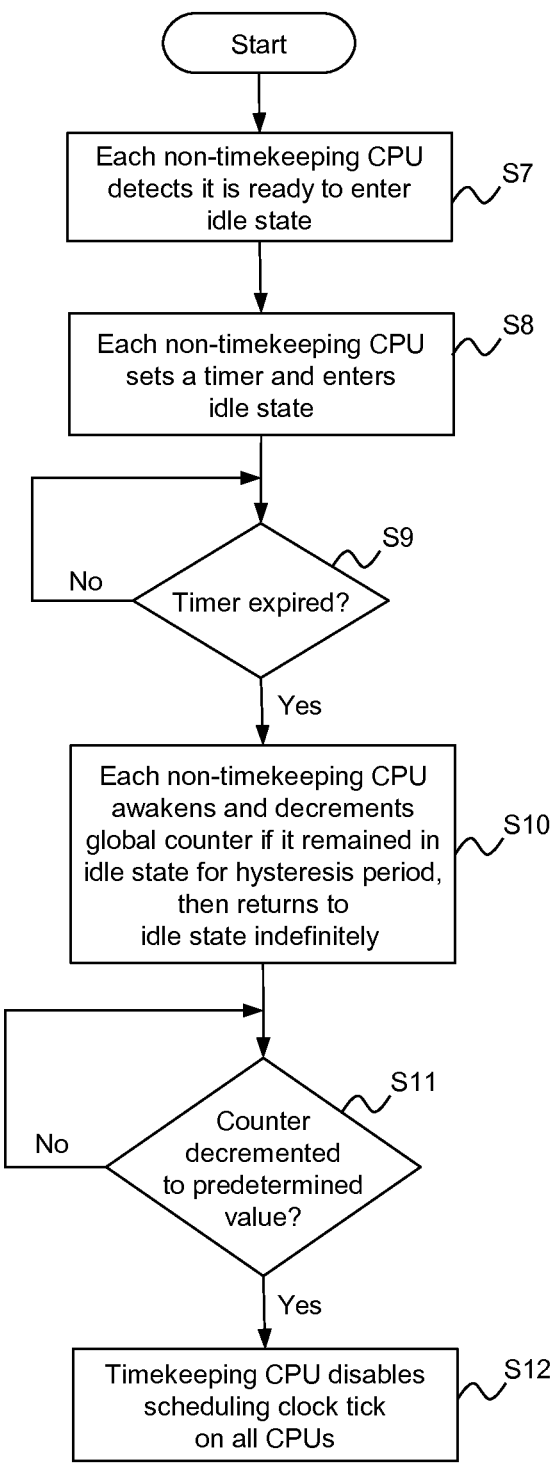
FIG. 2 is a flow diagram showing a first example embodiment of the general technique shown in FIG. 1.

FIG. 2 illustrates a first example embodiment that is representative of the above approach. Block S7 represents an example implementation of the operation of block S1 of FIG. 1, which comprises detecting a non-timekeeping CPU idle state. In block S7, this operation is performed by each non-timekeeping CPU detecting it is ready to enter an idle state. Block S8 represents an example implementation of block S2 of FIG. 1, which comprises initiating a hysteresis period. In block S8, this operation is performed by each non-timekeeping CPU setting a timer, then entering the idle state. Block S9 represents an example implementation of block S3 of FIG. 1, which comprises waiting for the hysteresis period to end. In block S9, this operation is performed by each non-timekeeping CPU remaining in the idle state until it is awakened by the timer. Block S10 represents an example implementation of block S4 of FIG. 1, which comprises manipulating a data structure. In block S10, this operation is performed by each non-timekeeping CPU decrementing a global counter if it remained in the idle state for the hysteresis period, then returning to the idle state indefinitely. Blocks S11 and S12 represent an example implementation of blocks S5 and S6 of FIG. 1, which comprise disabling of the scheduling clock tick on all of the CPUs if the data structure is determined to be in an appropriate state. In blocks S11 and S12, this operation is performed by the timekeeping CPU based on the global counter having been decremented to a predetermined value indicating that all of the non-timekeeping CPUs have remained in the idle state for at least the hysteresis period.

Using a constant time period for hysteresis can be problematic, since the level of memory contention on the counter will typically be a function of the number of CPUs. This can be addressed in the first example embodiment by making the time period be an increasing function of the total number of CPUs present on the system. This approach works, meeting all of the criteria listed at the end of the Background section above, but requires that long-term-idle CPUs be awakened at least once by the timer, thus again wasting energy.

Therefore, the preferred embodiment is instead to enlist RCU's help in scanning CPUs to determine which are idle, in a manner similar to RCU's existing dyntick-idle subsystem. However, instead of a count of the number of non-idle CPUs, this approach instead maintains a global state variable named full_sysidle_state that can take on any of the states shown in Code Listing 1 below (representing example implementation code written in the C programming language):

---
Code Listing 1:
---

```
1  static int full_sysidle_state;
2  #define RCU_SYSIDLE_NOT
3  #define RCU_SYSIDLE_SHORT
4  #define RCU_SYIDLE_LONG
5  #define RCU_SYSIDLE_FULL
6  #define RCU_SYSIDLE_FULL_NOTED
```

The full_sysidle_state variable is initially set to RCU_SYSIDLE_NOT, indicating that at least one non-timekeeping CPU is non-idle. If RCU's scan determines that there are no non-idle CPUs, it advances the state to RCU_SYSIDLE_SHORT, indicating that all non-timekeeping CPUs have been idle for a short period. If all non-timekeeping CPUs remain idle for long enough, the state advances to RCU_SYSIDLE_LONG, indicating that all non-timekeeping CPUs have been idle long enough that the state variable may be changed without danger of excessive memory contention. After an additional scan finds all CPUs still idle, the state advances to RCU_SYSIDLE_FULL, indicating timekeeping (and thus scheduling-clock interrupts) may be turned off.

All of the state transitions in the preceding paragraph are carried out by RCU's grace-period kthreads, which must be bound to the timekeeping CPU, for otherwise these kthreads would prevent the non-timekeeping CPUs from all being idle. Then, if the timekeeping CPU sees that the state is RCU_SYSIDLE_FULL, it advances the state to RCU_SYSIDLE_FULL_NOTED and turns off timekeeping.

If any non-timekeeping CPU transitions from idle to non-idle state, and sees that the state variable's value is any of RCU_SYSIDLE_LONG, RCU_SYSIDLE_FULL or RCU_SYSIDLE_FULL_NOTED, it forces the state back to RCU_SYSIDLE_NOT. Furthermore, if the state was RCU_SYSIDLE_FULL_NOTED, it sends an inter-processor interrupt (IPI) to the timekeeping CPU in order to force timekeeping to be resumed.

All of these state transitions must be carried out atomically, and must also use carefully placed memory barriers. In addition, smaller battery-powered devices need to make the to-idle transition quickly in order to avoid excessively short battery lifetimes. But on larger systems, the effect is to avoid the need for frequent manipulation of the full_sysidle_state variable, thus avoiding memory contention and associated scalability limitations.

Figure 3:
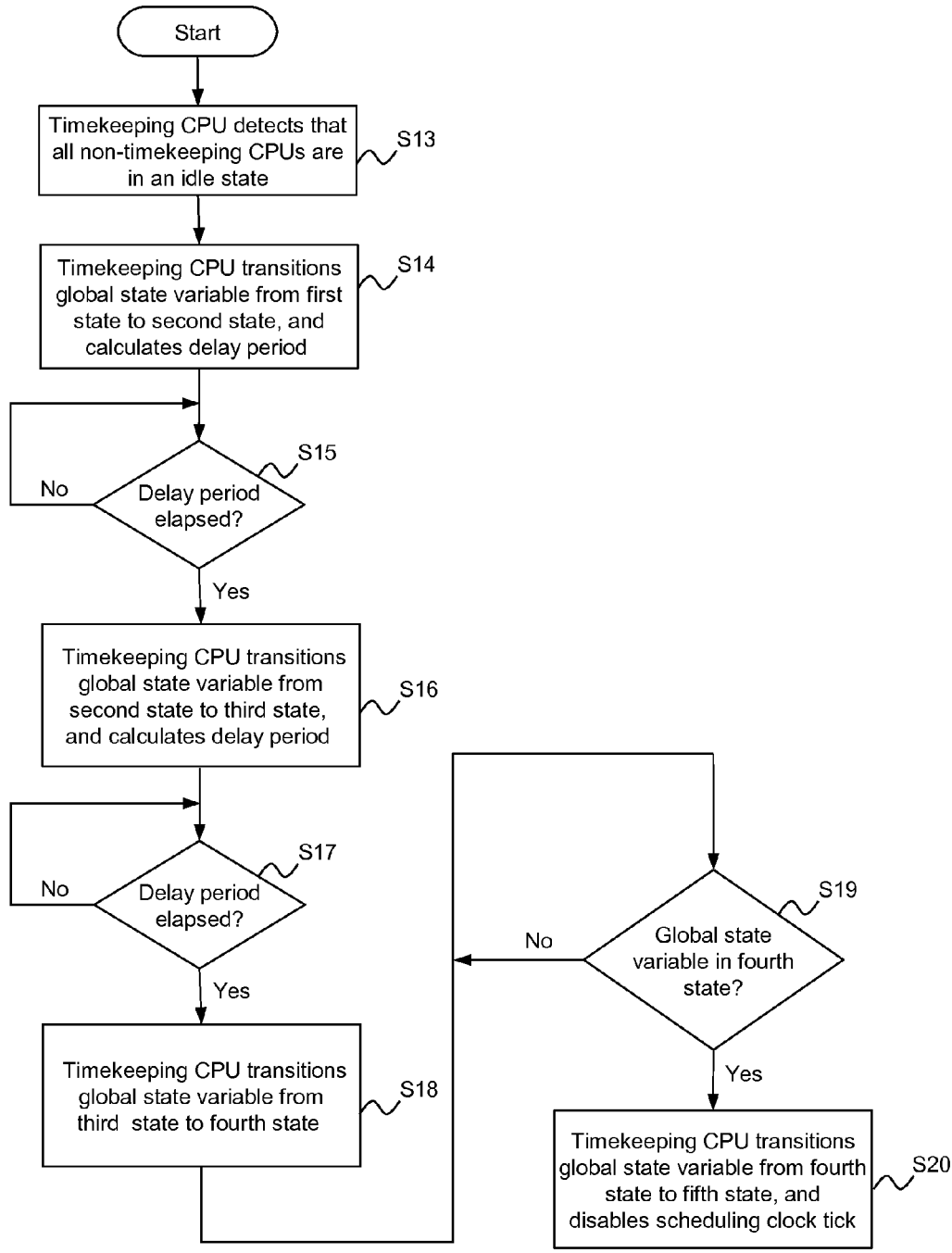
FIG. 3 is a flow diagram showing a second example embodiment of the general technique shown in FIG. 1.

FIG. 3 illustrates a second example embodiment that is representative of the above approach. Block S13 represents an example implementation of the operation of block S1 of FIG. 1, which comprises detecting a non-timekeeping CPU idle state. In block S13, this operation is performed by the timekeeping CPU detecting that all the non-timekeeping CPUs are in an idle state. In the second example embodiment, the operations of FIG. 1's block S2 (initiating a hysteresis period) and block S3 (waiting for the hysteresis period to end) are performed in two stages. These operations use the global state variable, full_sysidle_state, which, as discussed above, indicates whether or not all of the non-timekeeping CPUs are in an idle state, and if so, for how long. As mentioned, the global state variable is configured to store a first state (RCU_SYSIDLE_NOT) indicating that at least one non-timekeeping CPU is in a non-idle state, a second state (RCU_SYSIDLE_SHORT) indicating that all of the non-timekeeping CPUs have been in an idle state for a relatively short time period, a third state (RCU_SYSIDLE_LONG) indicating that all of the non-timekeeping CPUs have been in an idle state long enough that the global state variable may be changed without danger of excessive memory contention, a fourth state (RCU_SYSIDLE_FULL) indicating that all of the non-timekeeping CPUs have been in an idle state long enough to warrant turning off the scheduling clock tick, and a fifth state (RCU_SYSIDLE_FULL_NOTED) indicating that the timekeeping CPU has noted the fourth state and turned off the scheduling clock tick on all of the CPUs.

Blocks S14 and S15 represent a first stage of the operations of blocks S2 and S3 of FIG. 1. In block S14, a first hysteresis period initiating operation (per block S2 of FIG. 1) is performed by the timekeeping CPU transitioning the global state variable from the first state to the second state, and thereafter calculating a first delay period. In block S15 a first hysteresis period waiting operation (per block S3 of FIG. 1) is performed by the timekeeping CPU waiting until the first delay period has elapsed. Blocks S16 and S17 represent a second stage of the operations of blocks S2 and S3 of FIG. 1. In block S16, the operation of initiating a hysteresis period (per block S2 of FIG. 1) is performed by the timekeeping CPU transitioning the global state variable from the second state to the third state, and thereafter calculating a second delay period. In block S17 a second hysteresis period waiting operation (per block S3 of FIG. 1) is performed by the timekeeping CPU waiting until the second delay period has elapsed.

Block S18 represents an example implementation of the operation of block S4 of FIG. 1, which comprises manipulating a data structure. In block S18, this operation is performed by the timekeeping CPU transitioning the global state variable from the third state to the fourth state after the second delay period has elapsed. Blocks S19 and S20 represent an example implementation of the operation of blocks S5 and S6 of FIG. 1, which comprise disabling of the scheduling clock tick on all of the CPUs if the global state variable is determined to be in an appropriate state. In blocks S19 and S20, these operations are performed by the timekeeping CPU based on the global state variable being in the fourth state, and includes the timekeeping CPU transitioning the global state variable from the fourth state to the fifth state, then disabling the scheduling clock tick.

In the second example embodiment, the global state variable is maintained as part of a Read-Copy Update (RCU) dyntick-idle subsystem, and state transitions of the global state variable between the first state, the second state and the third state are performed by an RCU grace period tracking kthread running on the timekeeping CPU.

In the second example embodiment, the non-timekeeping CPUs record their entry into idle state using a per-CPU idle state variable, and the RCU dyntick-idle subsystem checks the per-CPU idle state variables and transitions the global state variable from the first state to the second state if each non-timekeeping CPU has set its per-CPU idle state variable to indicate the idle state.

In the second example embodiment, the calculations to determine the first and second delay periods are based on the number of CPUs, and if that number exceeds a threshold, a rate of the scheduling clock tick and an RCU leaf fanout size.

In the second example embodiment, the scheduling clock tick is restored by one of the non-timekeeping CPUs awakening out of its idle state, checking the global state variable, transitioning the global state variable to the first state if it is in any of the third through fifth states, and sending an inter-processor interrupt to the timekeeping CPU if the global state variable is in the fifth state.

The following sections cover aspects of the second example embodiment at a source-code level. However, before discussing this material, it will be helpful to describe an example system environment in which the presently-disclosed full-system idle detection technique may be implemented.

Example System Environment

Figure 4:
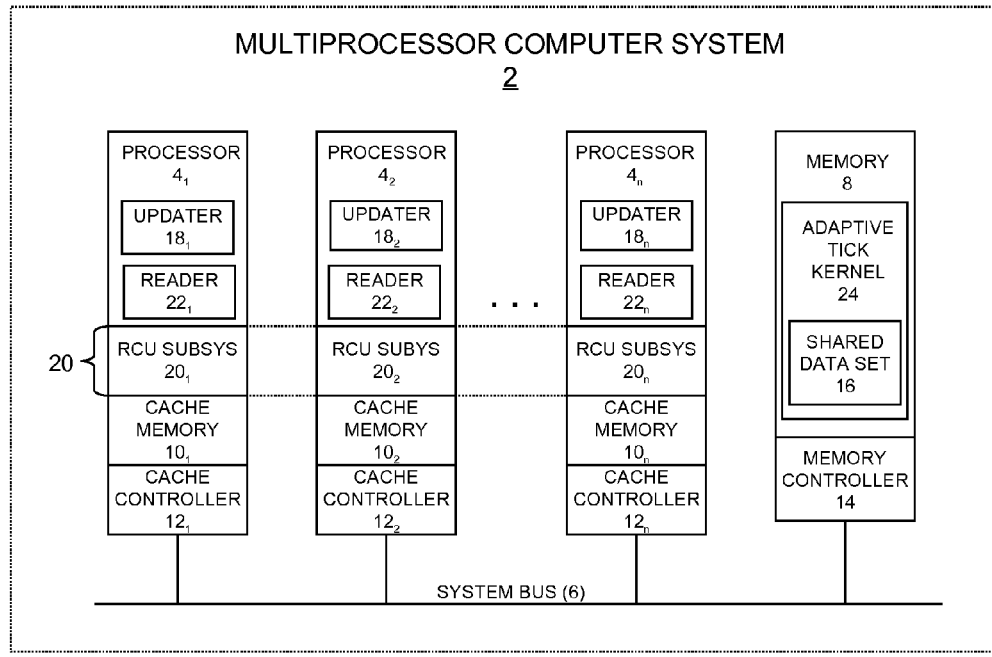
FIG. 4 is a logical block diagram showing an example computer system.

Turning now to the drawing figures, wherein like reference numerals represent like elements in all of the several views, FIG. 4 illustrates an example multiprocessor computer system in which the grace period processing technique described herein may be implemented. In FIG. 4, a computer system 2 includes multiple processors $4_1, 4_2 \ldots 4_n$, a system bus 6, and a program memory 8. There are also cache memories $10_1, 10_2 \ldots 10_n$ and cache controllers $12_1, 12_2 \ldots 12_n$ respectively associated with the processors $4_1, 4_2 \ldots 4_n$. A conventional memory controller 14 is again associated with the memory 8. As shown, the memory controller 14 may reside separately from processors $4_2 \ldots 4_n$ (e.g., as part of a chipset).

The computer system 2 may represent any of several different types of computing apparatus. Such computing apparatus may include, but are not limited to, general purpose computers, special purpose computers, portable computing devices, communication and/or media player devices, set-top devices, embedded systems, and other types of information handling machines. The term "processor" as used with reference to the processors $4_1, 4_2 \ldots 4_n$ encompasses any program execution unit capable of executing program instructions, including but not limited to a packaged integrated circuit device (such as a microprocessor), a processing core within a packaged integrated circuit device (such as a microprocessor core), or a hardware thread comprising one or more functional units within a processing core (such as an SMT thread). Each such execution unit may be referred to as a CPU (central processing unit). The processors $4_1, 4_2 \ldots 4_n$ may be situated within a single computing device or node (e.g., as part of a single-node SMP system) or they may be distributed over plural nodes (e.g., as part of a NUMA system, a cluster, or a cloud). The memory 8 may comprise any type of tangible storage medium capable of storing data in computer readable form for use in program execution, including but not limited to, any of various types of random access memory (RAM), various flavors of programmable read-only memory (PROM) (such as flash memory), and other types of primary storage (i.e., program memory). The cache memories $10_1, 10_2 \ldots 10_n$ may be implemented in several levels (e.g., as level 1, level 2 and level 3 caches) and the cache controllers $12_1, 12_2 \ldots 12_n$ may collectively represent the cache controller logic that supports each cache level. As illustrated, the memory controller 14 may reside separately from processors $4_1, 4_2 \ldots 4_n$, for example, as part of a discrete chipset. Alternatively, the memory controller 14 could be provided by plural memory controller instances that are respectively integrated with the processors $4_1, 4_2 \ldots 4_n$.

Each CPU embodied by a given processor 4 is operable to execute program instruction logic under the control of a software program stored in the memory 8 (or elsewhere). As part of this program execution logic, update operations (updaters) 18 may execute within a process, thread, or other execution context (hereinafter "task") on any of the processors 4. Each updater 18 runs periodically to perform updates on a set of shared data 16 that may be stored in the shared memory 8 (or elsewhere). In FIG. 4, reference numerals $18_1, 18_2 \ldots 18_n$ illustrate individual data updaters that respectively execute on the several processors $4_1, 4_2 \ldots 4_n$. The updates performed by an updater 18 can include modifying elements of a linked list, inserting new elements into the list, deleting elements from the list, and other types of operations. To facilitate such updates, the processors 4 may be programmed from instructions stored in the memory 8 (or elsewhere) to implement a read-copy update (RCU) subsystem 20 as part of their processor functions. In FIG. 4, reference numbers $20_1, 20_2 \ldots 20_n$ represent individual RCU instances that may periodically execute on the several processors $4_1, 4_2 \ldots 4_n$. Any given processor 4 may also execute a read operation (reader) 22. Each reader 22 runs from program instructions stored in the memory 8 (or elsewhere) in order to periodically perform read operations on the set of shared data 16 stored in the shared memory 8 (or elsewhere). In FIG. 4, reference numerals $22_1, 22_2 \ldots 22_n$ illustrate individual reader instances that may respectively execute on the several processors $4_1, 4_2 \ldots 4_n$. Such read operations will typically be performed far more often than updates, this being one of the premises underlying the use of read-copy update. Moreover, it is possible for several of the readers 22 to maintain simultaneous references to one of the shared data elements 16 while an updater 18 updates the same data element. In FIG. 4, the shared data 16, the updaters 18, the RCU subsystem 20, and the readers 22, are part of an adaptive tick operating system kernel 24, which is loaded (in whole or in part) in the memory 8 (or elsewhere) and executed on the processors 4 during system operations. One example of an operating system that may be used to implement the adaptive tick kernel 24 is an instance of the Linux® kernel that has been compiled to provide adaptive tick functionality.

During operations of the computer system 2, an updater 18 will occasionally perform an update to one of the shared data elements 16. In accordance the philosophy of RCU, a first-phase update may be performed in a manner that temporarily preserves a pre-update view of the shared data element for the benefit of readers 22 that may be concurrently referencing the shared data element during the update operation. Following the first-phase update, the updater 18 may register a callback with the RCU subsystem 20 for the deferred destruction of the pre-update view following a grace period (second-phase update).

The grace period processing performed by the RCU subsystem 20 entails starting new grace periods and detecting the end of old grace periods so that the RCU subsystem 20 knows when it is safe to free stale data (or take other actions). Grace period processing may further entail the management of callback lists that accumulate callbacks until they are ripe for batch processing at the end of a given grace period. Additionally, as will now be described, grace period processing may further include operations that support the detection of a full-system idle state in the adaptive tick kernel 24.

Figure 5:
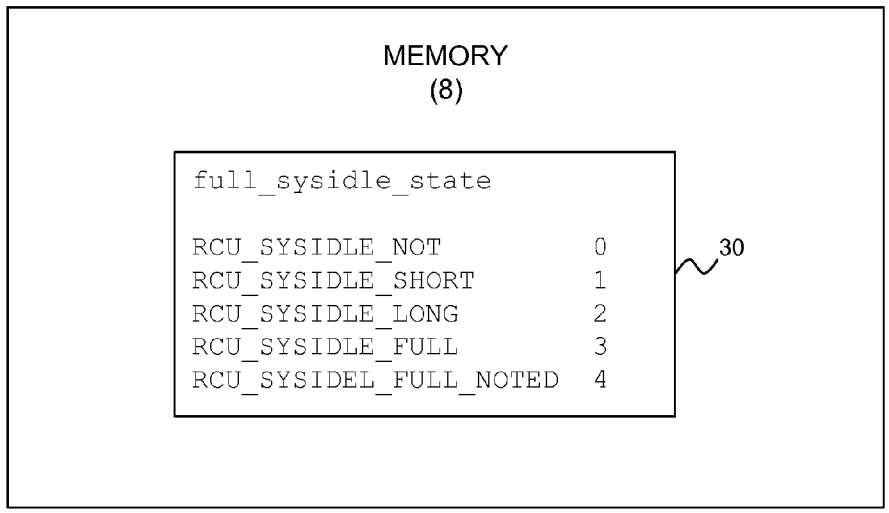
FIG. 5 is a logical block diagram showing an example global state variable for use in the second embodiment of FIG. 3.

Turning now to FIG. 5, the above-described full_sysidle_state global variable is shown by reference number 30. It resides in the system memory 8 during operation of the computer system 2. Each of possible state that the full_sysidle_state variable 24 may take is illustrated.

Figure 6:
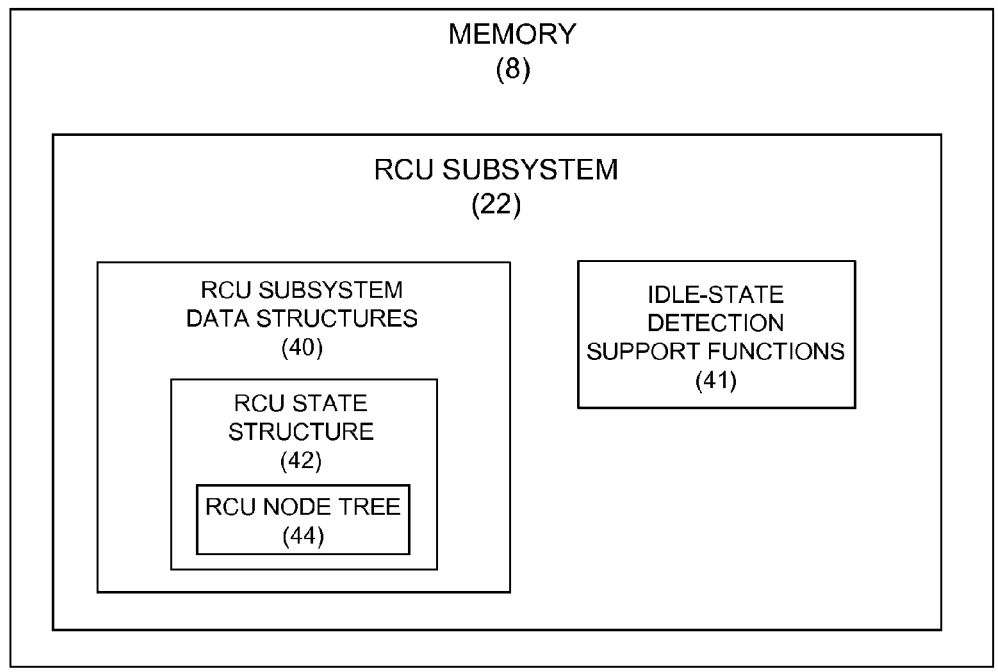
FIG. 6 is a logical block diagram showing example data structures and functions of an RCU subsystem for use in the second embodiment of FIG. 3.
Figure 7:
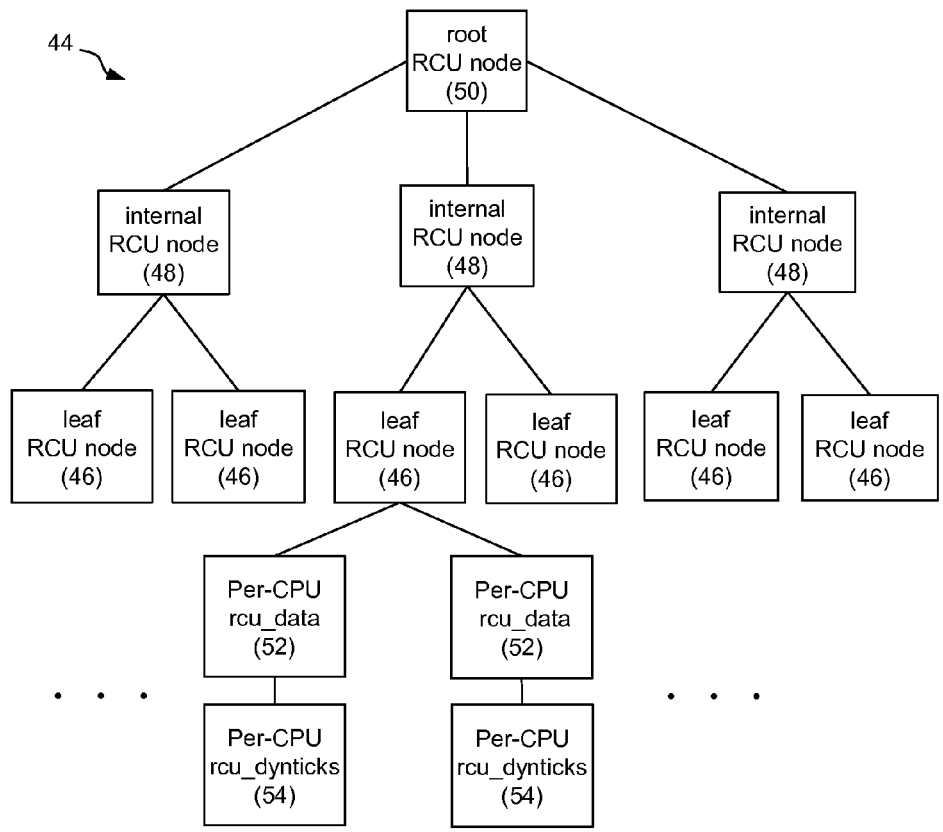
FIG. 7 is a logical block diagram showing an example RCU node tree and related data structures of the RCU subsystem of FIG. 6.

Turning now to FIG. 6, example functional components of the RCU subsystem 20 are shown. Among these components is a set of RCU subsystem data structures 40 and a set of idle-state detection support functions 41. The idle-state detection functions 41 are represented by the example source code functions of Code Listings 2-7, which are described in more detail below. The RCU subsystem data structures 40 include an RCU state structure 42 for tracking per-processor quiescent states. For purposes of the present disclosure, the RCU subsystem 20 may be configured as a hierarchical RCU implementation, as is conventionally provided in large multiprocessor computer systems running the Linux® kernel. In that case, the RCU subsystem data structures 40 will further include a tree 44 of RCU nodes embedded as a linear array within the RCU state structure 42. FIG. 7 illustrates an example three-level RCU node tree that includes six bottom-level leaf RCU nodes 46, three intermediate level internal RCU nodes 48, a top level root RCU node 50.

Each leaf RCU node 46 is reported to by a set of CPUs that periodically access their assigned leaf RCU node to record RCU quiescent states. Withing each CPU, a Linux® hierarchical RCU implementation maintains some per-CPU data, such as lists of RCU callbacks, organized into per-CPU rcu_data structures 52, two of which are shown in FIG. 7. In order to support energy conservation, a Linux® hierarchical RCU implementation requires that all CPUs manipulate counters located in a per-CPU rcu_dynticks structure 44, two of which are shown in FIG. 7. Loosely speaking, the rcu_dynticks counters have even-numbered values when the corresponding CPU is in dynticks idle mode, and have odd-numbered values otherwise. The RCU subsystem 20 thus needs to wait for quiescent states only for those CPUs whose rcu_dynticks counters are odd, and need not wake up sleeping CPUs, whose counters will be even.

Detecting Full-System Idle State in Adaptive-Ticks Kernels—Detailed Example Based on Second Example Embodiment Per-CPU Idle Status Tracking Code Listing 2 below (representing example implementation code written in the C programming language) shows per-CPU data tracking each CPU's idle state. In the Linux® kernel's hierarchical tree implementation, these are added to the existing rcu-dynticks structures 54. The reason they are necessary is that the existing fields consider user-mode execution to be "idle" (which it is from an RCU perspective), but for system-wide idleness detection, only the idle loop can be considered to be truly idle.

Code Listing 2

```
1   #ifdef CONFIG_NO_HZ_FULL_LASTIDLE
2   long long dynticks_idle_nesting;
3   atomic_t dynticks_idle;
4   unsigned long dynticks_idle_jiffies;
5   unsigned long dynticks_nmi_jiffies;
6   #endif /* #ifdef CONFIG_NO_HZ_FULL_LASTIDLE */
7
8   #define DYNTICK_TASK_NEST_WIDTH
9   #define DYNTICK_TASK_NEST_VALUE ((LLONG_MAX >> DYNTICK_TASK_NEST_WIDTH) + 1)
10  #define DYNTICK_TASK_NEST_MASK (LLONG_MAX - DYNTICK_TASK_NEST_VALUE + 1)
11  #define DYNTICK_TASK_FLAG ((DYNTICK_TASK_NEST_VALUE / 8) * 2)
12  #define DYNTICK_TASK_MASK ((DYNTICK_TASK_NEST_VALUE / 8) * 3)
13  #define DYNTICK_TASK_EXIT_IDLE DYNTICK_TASK_NEST_VALUE + \
14                                    DYNTICK_TASK_FLAG)
```

Figure 8:
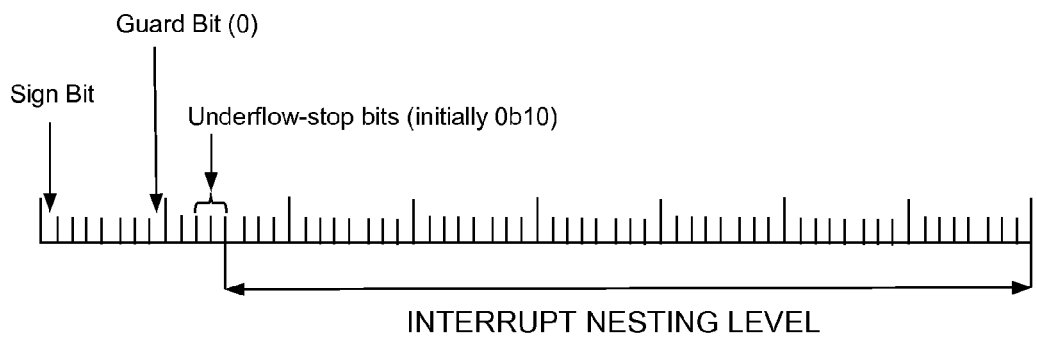
FIG. 8 is a diagrammatic illustration of a dyntick_idle_nesting variable for use in the second embodiment of FIG. 3.

The ->dynticks_idle_nesting field measures nesting depth of reasons that the CPU is non-idle. Each interrupt entry adds one to this counter, and each interrupt exit subtracts one. Because "Hotel California" interrupts that enter but never exit can and do occur, each transition from idle adds DYNTICK_TASK_NEST_VALUE and each transition to idle subtracts DYNTICK_TASK_NEST_VALUE, rounding to a multiple of DYNTICK_TASK_NEST_VALUE if the value is near zero, roughly speaking. This works in the same way as the existing RCU ->dynticks_nesting field, with bit definitions shown in FIG. 8. The underflow stop-bits prevent interrupt mis-nestings from affecting the task-level non-idle nesting.

The per-CPU idle-entry code (rcu_sysidle_enter( )) is shown below in Code Listing 3 (representing example implementation code written in the C programming language). This function is invoked every time the kernel transitions towards idle state, and interrupts are disabled throughout execution of this function. This is similar to the rcu_idle_enter( ) function already in the Linux® kernel, but tracking strict idle/non-idle state, with user-mode execution always counted as non-idle. In contrast, for CONFIG_NO_HZ_FULL=y kernels, rcu_idle_enter( ) is invoked for entry into usermode execution as well as into idle because there can be no in-kernel RCU read-side critical sections in user-mode code, just as there can be no in-kernel RCU read-side critical sections in idle. That said, the two functions are similar in requiring interrupts be disabled across all calls to each of them.

Code Listing 3

```
1   static void rcu_sysidle_enter(struct rcu_dynticks *rdtp, int irq)
2   {
3     unsigned long j;
4
5     if (irq) {
6       rdtp->dynticks_idle_nesting--;
7       WARN_ON_ONCE(rdtp->dynticks_idle_nesting < 0);
8       if (rdtp->dynticks_idle_nesting != 0)
9         return;
10    } else {
11      if ((rdtp->dynticks_idle_nesting & DYNTICK_TASK_NEST_MASK) ==
12          DYNTICK_TASK_NEST_VALUE) {
13        rdtp->dynticks_idle_nesting = 0;
14      } else {
15        rdtp->dynticks_idle_nesting -= DYNTICK_TASK_NEST_VALUE;
16        WARN_ON_ONCE(rdtp->dynticks_idle_nesting < 0);
17        return;
18      }
19    }
20    j = jiffies;
21    ACCESS_ONCE(rdtp->dynticks_nmi_jiffies) = j;
22    ACCESS_ONCE(rdtp->dynticks_idle_jiffies) = j;
23    smp_mb_before_atomic_inc( );
24    atomic_inc(&rdtp->dynticks_idle);
25    smp_mb_after_atomic_inc( );
26    WARN_ON_ONCE(atomic_read(&rdtp->dynticks_idle) & 0x1);
27  }
```

The rcu_sysidle_enter( ) function is called in line 1 with a pointer (*rdtp) to the specified CPU's rcu_dynticks structure 54 (see FIG. 7). Line 5 of the above code checks to see if rcu_sysidle_enter( ) was called from interrupt context, and if so, line 6 decrements ->dynticks_idle_nesting, line 7 warns if the result is negative, and if line 8 finds that the result was non-zero (that is, the CPU is still nested in interrupt context), line 9 returns.

Otherwise, rcu_sysidle_enter( ) was called from process context, so lines 11 and 12 check to see if this is the outermost task-level non-idle nesting, and if so, line 13 sets ->dynticks_idle_nesting to zero. Otherwise, line 15 decrements the task-level non-idle nesting counter, line 16 complains if the result is negative, and line 17 returns (because we are still nested in task-level non-idle context).

If execution reaches line 20, this CPU is transitioning to idle state. Line 20 records a jiffies timestamp, lines 21 and 22 record the start of the idle state from an NMI and non-NMI perspective, respectively. Lines 23-25 atomically increment ->dynticks_idle, which should cause the low-order bit to become zero: Line 26 complains if this is not the case.

The overall effect is that ->dynticks_idle is even when the CPU is idle and odd otherwise, with the memory barriers allowing remote CPUs reliably test idleness.

Exit from idle is handled by rcu_sysidle_force_exit( ) and rcu_sysidle_exit( ), which are shown below in Code Listing 4 (representing example implementation code written in the C programming language). The rcu_sysidle_exit( ) function is invoked every time the kernel transitions towards idle state, and it has the same relationship to rcu_idle_exit( ) that rcu_sysidle_enter( ) has to rcu_idle_enter( ). Interrupts must be disabled across all calls to both functions.

Code Listing 4

```
1   void rcu_sysidle_force_exit(void)
2   {
3     int oldstate = ACCESS_ONCE(full_sysidle_state);
4     int newoldstate;
5
6     while (oldstate > RCU_SYSIDLE_SHORT) {
7       newoldstate = cmpxchg(&full_sysidle_state,
8                             oldstate, RCU_SYSIDLE_NOT);
9       if (oldstate == newoldstate &&
10          oldstate == RCU_SYSIDLE_FULL_NOTED) {
11        rcu_kick_nohz_cpu(tick_do_timer_cpu);
12        return;
13      }
14      oldstate = newoldstate;
15    }
16    smp_mb( );
17  }
18
19  static void rcu_sysidle_exit(struct rcu_dynticks *rdtp, int irq)
20  {
21    if (irq) {
22      rdtp->dynticks_idle_nesting++;
23      WARN_ON_ONCE(rdtp->dynticks_idle_nesting <= 0);
```

Code Listing 4

```
24      if (rdtp->dynticks_idle_nesting != 1)
25        return;
26    } else {
27      if (rdtp->dynticks_idle_nesting & DYNTICK_TASK_NEST_MASK) {
28        rdtp->dynticks_idle_nesting += DYNTICK_TASK_NEST_VALUE;
29        WARN_ON_ONCE(rdtp->dynticks_idle_nesting <= 0);
30        return;
31      } else {
32        rdtp->dynticks_idle_nesting = DYNTICK_TASK_EXIT_IDLE;
33      }
34    }
35    smp_mb_before_atomic_inc( );
36    atomic_inc(&rdtp->dynticks_idle);
37    smp_mb_after_atomic_inc( );
38    WARN_ON_ONCE(!(atomic_read(&rdtp->dynticks_idle) & 0x1));
39    if (smp_processor_id( ) == tick_do_timer_cpu)
40      return;
41    rcu_sysidle_force_exit( );
42  }
```

The rcu_sysidle_exit( ) function (lines 19-42) is called in line 19 with a pointer (*rdtp) to the specified CPU's rcu_dynticks structure 54 (see FIG. 7). This function records the current CPU's state change, and then calls rcu_sysidle_force_exit( ) (lines 1-17) if needed to mark the end of a system-wide idle period. The rcu_sysidle_force_exit( ) function may also be called externally, for example, if the timekeeping CPU independently recognizes that the system is now non-idle. This can happen due to the fact that this code ignores the timekeeping CPU's idle state: Instead, the timekeeping CPU checks the "system-wide" idle state when it goes idle.

The rcu_sysidle_force( ) function first picks up the current system-wide idle state on line 3. Each pass through the loop spanning lines 6-15 checks to see if the state has advanced past RCU_SYSIDLE_SHORT (see Code Listing 1 for the state definitions), and if so, lines 7 and 8 attempt to atomically set it to RCU_SYSIDLE_NOT. If line 9 determines that the attempt was successful and line 10 determines that the timekeeping CPU noted a full sysidle state, line 11 informs the timekeeping CPU of the state change and line 12 returns to then caller. Otherwise, line 14 picks up the new version of full_sysidle_state in preparation for the next pass through the loop. If the while loop terminates due to the state not being beyond RCU_SYSIDLE_SHORT, execution advance to line 16, which executes a memory barrier to ensure that the while loop's fetch of full_sysidle_state happens before the execution of the subsequent non-idle code on this CPU.

The compare-and-exchange operation on lines 7 and 8 could potentially result in high memory contention if all CPUs went non-idle at the same instant. This would quickly resolve itself, so would not be a problem for most workloads, but for extremely latency-sensitive workloads, a tournament tree may be used to diffuse the contention. An example of such a tournament tree may be found in force_quiescent_state( ) of version 3.9 of the Linux® kernel.

The rcu_sysidle_exit( ) function shown on lines 19-42 of the listing manipulates the full-system-idle counters in the rcu_dynticks structure. If line 21 determines that this exit from idle is due to an interrupt, line 22 increments the ->dynticks_idle_nesting counter, line 23 complains if the result is non-positive, and if line 24 determines that the interrupt interrupted non-idle code, line 25 returns to the caller without any further action.

Otherwise, this is a task-level exit from idle, in which case line 27 checks to see if this CPU was already non-idle. If so, line 28 adds DYNTICK_TASK_NEXT_VALUE to ->dynticks_idle_nesting (thus incrementing the "Task-level non-idle nesting" group of bits in FIG. 8), line 29 complains if the result is non-positive, and line 30 returns to the caller. Otherwise, this CPU is transitioning to idle, so line 32 sets ->dynticks_idle_nesting to DYNTICKS_TASK_EXIT_IDLE, thus initializing the "Task-level non-idle nesting" group of bits in FIG. 8 to one and the "Underflow-stop" bits to 0b10.

If this CPU is transitioning from idle to non-idle, whether due to an interrupt or a task-level action, lines 35-37 atomically increment ->dynticks_idle and line 38 complains if the resulting value is even. If line 39 determines that this is the timekeeping CPU, line 40 returns to the caller (the timekeeping CPU can go non-idle without exiting the full-system idle state). Otherwise, line 41 calls rcu_sysidle_force_exit( ) to exit the full-system idle state.

Checking Per-CPU Idleness

Code Listing 5 (representing example implementation code written in the C programming language) shows rcu_sysidle_check_cpu( ), which checks the specified CPU's idle state. This function is intended to be invoked with interrupts disabled on each CPU in turn as part of the force-quiescent-state process by RCU's grace-period kthread, which must be constrained to run on the timekeeping CPU. The current CPU is identified by the instance of the per-CPU rcu_data structure 52 (see FIG. 7) referenced by the *rdp argument. The isidle argument points to a variable, initially set to true, that tracks the idle state of this scan, and is set to zero upon encountering the first non-idle CPU. The maxj argument points to a timestamp variable, initially set to a long time in the past, which is set to the maximum (most recent) time that any of the CPUs most recently went idle. Therefore, at the end of the scan, the caller can determine whether or not all of the non-timekeeping CPUs are idle, and if they are idle, the length of the period of time during which they have all been idle.

Code Listing 5

```
1   static void rcu_sysidle_check_cpu (struct rcu_data *rdp,
      bool *isidle,
```

-continued

Code Listing 5

```
2                                           unsigned long *maxj)
3  {
4    int cur;
5    int curnmi;
6    unsigned long j;
7    unsigned long jnmi;
8    struct rcu_dynticks *rdtp = rdp->dynticks;
9
10   if (!*isidle || rdp->rsp != rcu_sysidle_state || cpu_is_offline(cpu) ||
11       rdp->cpu == tick_do_timer_cpu)
12     return;
13   WARN_ON_ONCE(smp_processor_id( ) != tick_do_timer_cpu);
14   cur = atomic_read(&rdtp->dynticks_idle);
15   curnmi = ACCESS_ONCE(rdtp->dynticks_nmi_nesting);
16   if ((cur & 0x1) || curnmi > 0) {
17     *isidle = 0;
18     return;
19   }
20   smp_mb( );
21   j = ACCESS_ONCE(rdtp->dynticks_idle_jiffies);
22   jnmi = ACCESS_ONCE(rdtp->dynticks_nmi_jiffies);
23   if (ULONG_CMP_LT(j, jnmi)) {
24     j = jnmi;
25     ACCESS_ONCE(rdtp->dynticks_idle_jiffies) = jnmi;
26   }
27   if (ULONG_CMP_LT(*maxj, j))
28     *maxj = j;
29  }
```

The rcu_sysidle_check_cpu( ) function is called in line 1 with a pointer (*rdp) to the specified CPU's rcu_data structure 52 (see FIG. 7). Line 8 picks up a pointer to the specified CPU's rcu_dynticks structure, and lines 10 and 11 make a number of checks:

1. Has the scan thus far encountered a non-idle CPU? (!*isidle)? If so, there is no point in checking this CPU.

2. Is this some RCU flavor other than the one that has been designated to scan and update system-wide idle state (rdp->rsp !=rcu_sysidle_state) (rsp being the RCU state structure 42 (see FIG. 7))? If so, this CPU should not be checked.

3. Is the current CPU offline (cpu_is_offline (cpu))? If so, it will be idle indefinitely, so there is no point in specifically checking it.

4. Is the current CPU the timekeeping CPU (rdp->cpu==tick_do_timer_cpu)? If so, it does not contribute to system-wide idleness, and once again should not be checked.

If any of these conditions hold, line 12 returns to the caller without checking the specified CPU. Otherwise, line 13 complains if the current CPU (as opposed to the CPU being checked) is not the timekeeping CPU. Line 14 picks up the checked CPU's ->dynticks_idle value, and line 15 picks up its ->dynticks_nmi_nesting value. If line 16 determines that either value indicates that the CPU being checked is non-idle, line 17 clears the idle state indicator and line 18 returns to the caller.

On the other hand, if line 16 determines that the CPU being checked is in fact idle, line 20 executes a memory barrier to ensure that the fetches on lines 14 and 15 occur before the timestamp fetches on lines 21 and 22. If line 23 determines that an NMI happened more recently than the most recent non-idle period of any other type, line 24 uses the NMI's timestamp and updates the non-NMI timestamp to this value. If line 27 determines that the most recent of these two timestamps is in turn more recent than that of the most recently non-idle CPU thus far, line 28 updates accordingly.

Recording Non-Timekeeping CPU Idleness

Code Listing 6 (representing example implementation code written in the C programming language) shows rcu_sysidle_report( ) (lines 35-44) and its three helper functions, rcu_sysidle_delay( ) (lines 1-6), rcu_sysidle( ) (lines 8-27), and rcu_sysidle_cancel( ) (lines 29-33). Interrupts must be disabled across all calls to these functions.

Code Listing 6

```
1   static unsigned long rcu_sysidle_delay(void)
2   {
3     if (nr_cpu_ids <= RCU_SYSIDLE_SMALL)
4       return 0;
5     return DIV_ROUND_UP(nr_cpu_ids * HZ, rcu_fanout_leaf * 1000);
6   }
7
8   static void rcu_sysidle(unsigned long j)
9   {
10    switch (ACCESS_ONCE(full_sysidle_state)) {
11    case RCU_SYSIDLE_NOT:
12      ACCESS_ONCE(full_sysidle_state) = RCU_SYSIDLE_SHORT;
13      break;
14    case RCU_SYSIDLE_SHORT:
15      if (ULONG_CMP_GE(jiffies, j + rcu_sysidle_delay( )))
16        (void)cmpxchg(&full_sysidle_state,
17                      RCU_SYSIDLE_SHORT, RCU_SYSIDLE_LONG);
18    case RCU_SYSIDLE_LONG:
19      if (ULONG_CMP_GE(jiffies, j + rcu_sysidle_delay( )))
20        (void)cmpxchg(&full_sysidle_state,
21                      RCU_SYSIDLE_LONG, RCU_SYSIDLE_FULL);
22      break;
23
24    default:
25      break;
26    }
27   }
28
29   static void rcu_sysidle_cancel(void)
30   {
31     smp_mb( );
```

Code Listing 6

```
32      ACCESS_ONCE(full_sysidle_state) = RCU_SYSIDLE_NOT;
33    }
34
35    static void rcu_sysidle_report(struct rcu_state *rsp, int isidle,
36                                    unsigned long maxj)
37    {
38      if (rsp != rcu_sysidle_state)
39        return;
40      if (isidle)
41        rcu_sysidle(maxj);
42      else
43        rcu_sysidle_cancel( );
44    }
```

The rcu_sysidle_report( ) function is called in line 35 with a pointer (*rsp) to the RCU state structure 42 (see FIG. 7). The function checks to see if this is the right flavor of RCU on line 38, and if not, line 39 returns to the caller. Otherwise, if line 40 determines that the scan found all non-timekeeping CPUs idle, line 41 invokes rcu_sysidle( ) with the time that the last CPU entered idle, and if not, line 43 invokes rcu_sysidle_cancel( ).

The rcu_sysidle_cancel( ) function executes a memory barrier on line 31 to ensure that the prior scan happens before line 32 forces the full-system idle state to RCU_SYSIDLE_NOT. The rcu_sysidle( ) function advances the full-system idle state. State RCU_SYSIDLE_NOT is unconditionally advanced to RCU_SYSIDLE_SHORT, but states RCU_SYSIDLE_SHORT and RCU_SYSIDLE_LONG are advanced to RCU_SYSIDLE_LONG and RCU_SYSIDLE_FULL, respectively, only if the idle period exceeds the timespan specified by rcu_sysidle_delay( ). The RCU_SYSIDLE_FULL state is not advanced by rcu_sysidle( ), but is instead advanced by rcu_sys_is_idle( ), which is covered later.

Finally, rcu_sysidle_delay( ) calculates the hysteresis period. It returns the number of jiffies that are required to advance the state to RCU_SYSIDLE_FULL. The hysteresis period is based on the number of CPUs in the system, and if that number exceeds a threshold, the scheduling clock tick rate and the RCU leaf fanout in the RCU node tree 44 (see FIG. 7) are also considered. If line 3 determines that the system has only a few CPUs, line 4 permits the advance to happen immediately. Otherwise, line 5 calculates the delay based on the number of CPUs, the scheduling-clock tick rate, and the RCU leaf fanout. The idea is to maintain memory contention on the full_sysidle_state variable at an acceptably low level no matter how large the system is.

Reading Out Full-System Idle State

Code Listing 7 (representing example implementation code written in the C programming language), shows the rcu_sys_is_idle( ) function. This function allows the timekeeping CPU to query the full-system idle state, and must be invoked with interrupts disabled.

Code Listing 7

```
1     static bool rcu_sys_is_idle(void)
2     {
3       static struct rcu_sysidle_head rsh;
4       int rss = ACCESS_ONCE(full_sysidle_state);
5
6       WARN_ON_ONCE(smp_processor_id( ) != tick_do_timer_cpu);
7       if (nr_cpu_ids <= RCU_SYSIDLE_SMALL && rss < RCU_SYSIDLE_FULL) {
8         int cpu;
9         bool isidle = true;
10        unsigned long maxj = jiffies - ULONG_MAX / 4;
11        struct rcu_data *rdp;
12
13        for_each_possible_cpu(cpu) {
14          rdp = &per_cpu_ptr(rcu_sysidle_state->rda, cpu);
15          rcu_sysidle_check_cpu(rdp, &isidle, &maxj);
16          if (!isidle)
17            break;
18        }
19        rcu_sysidle_report(rcu_sysidle_state, isidle, maxj);
20        rss = ACCESS_ONCE(full_sysidle_state);
21      }
22      if (rss == RCU_SYSIDLE_FULL) {
23        rss = cmpxchg(&full_sysidle_state,
24                      RCU_SYSIDLE_FULL, RCU_SYSIDLE_FULL_NOTED);
25        return rss == RCU_SYSIDLE_FULL;
26      }
27      smp_mb( );
28      if (rss == RCU_SYSIDLE_FULL_NOTED)
29        return true;
30      if (nr_cpu_ids > RCU_SYSIDLE_SMALL &&
31          !rcu_gp_in_progress(rcu_sysidle_state) &&
```

-continued

Code Listing 7

```
32       !rsh.inuse && xchg(&rsh.inuse, 1) == 0)
33         call_rcu(&rsh.rh, rcu_sysidle_cb);
34    return false;
35  }
```

Line 4 picks up the current state, and line 6 complains if this is not the timekeeping CPU. Lines 7-21 handle the special case of a small system that is not yet fully idle. For small systems, we can afford to scan all the CPUs each time the timekeeping CPU would like to go idle, and such a scan is exactly what the loop spanning lines 13-18 does, after lines 9 and 10 carry out the needed initialization. Within this loop, line 14 picks up a pointer to the current iteration's CPU's rcu_data structure 52, then line 15 invokes rcu_sysidle_check_cpu( ) to check that CPU's idle state. If line 16 sees that it was non-idle, line 17 breaks from the loop. Once the loop terminates, line 19 invokes rcu_sysidle_report( ) to update the full-system idleness state, which line 20 fetches in preparation for subsequent processing.

Systems both large and small execute line 22, which checks to see if the system is fully idle, but noted by the timekeeping CPU. If so, lines 23 and 24 attempt to atomically compare and exchange full_sysidle_state from RCU_SYSIDLE_FULL to RCU_SYSIDLE_FULL_NOTED. Line 25 then returns an indication as to whether this atomic operation succeeded, in other words, whether the state is now in full system-idle state (RCU_SYSIDLE_FULL_NOTED). The reason why rss cannot be equal to RCU_SYSIDLE_FULL_NOTED is because this is the only CPU that attempts to change the state to RCU_SYSIDLE_FULL_NOTED, so any cmpxchg( ) failure must leave full_sysidle_state having some other value.

Otherwise, line 27 executes a memory barrier to ensure that the prior fetch from full_sysidle_state happens before subsequent processing. If line 28 sees that the state is now RCU_SYSIDLE_FULL_NOTED, line 29 returns true, indicating that the system is now in full system-idle state. If not, lines 30-32 check to see if this is a large system in which RCU is currently idle and where the rsh structure (which consists of a rcu_callback structure named rh and a flag named inuse) is available for use. If so, line 33 registers an RCU callback in order to force RCU into action. Either way, line 35 returns false, indicating that the system is not yet fully idle.

Integration Into Linux® Kernel RCU

Some additional work is required to interface these functions to RCU. The rcu_sysidle_enter( ) function must be invoked from both rcu_idle_enter( ) and rcu_irq_exit( ). Similarly, rcu_sysidle_exit( ) must be invoked from both rcu_idle_exit( ) and rcu_irq_enter( ).

RCU's grace-period kthreads must bind themselves to the timekeeping CPU, as indicated by the tick_do_timer_cpu variable. In configurations where the time-keeping can migrate among CPUs, the grace-period kthreads must periodically check to see whether they are running on the correct CPU. Running on the wrong CPU will not invalidate the system-idle state, but it can prevent the system from becoming fully idle, especially for the larger systems that rely on RCU to advance the system-idle state.

RCU's force_qs_rsp( ), force_qs_rnp( ), dyntick_save_progress_counter, and rcu_implicit_dynticks_qs( ) need new isidle and maxj pointer arguments.

The rcu_gp_fqs( ) function needs isidle and maxj local variables, which it must initialize to true and jiffies—ULONG_MAX/4, respectively, and which it must pass to force_qs_rsp( ) in both clauses of the if statement checking for RCU_SAVE_DYNTICK. Immediately after calling force_qs_rnp( ) in the then clause, rcu_sysidle_report( ) must be called. In turn, immediately prior to calling force_qs_rnp( ) in the else clause, isidle should be set to zero.

The force_qs_rnp( ) function must set *isidle to zero whenever the current bit of rnp->qsmask is zero.

The rcu_nmi_exit( ) function must set the rcu_dynticks structure's ->dyntick_nmi_jiffies field to the current jiffies timestamp.

Potential Issues

In any implementation of the above-described full-system idle state detection technique, potential issues that may arise, and their suggested resolution, include the following:

1. Idle loops that pop out frequently to re-evaluate energy-efficiency settings would never accumulate sufficient idleness to allow a full-system idle state to occur. Then again, they will also waste energy by waking up the CPU frequently.

2. Some systems might need an acknowledgement from the timekeeping CPU any time some other CPU wakes up and ends a full-system idle state. The Linux® kernel does not require this because timekeeping is adjusted if needed on each exit from idle by any CPU.

3. The calculations in rcu_sysidle_delay( ) to determine the hysteresis period are heuristic in nature, and alternative forms could be used. Systems with unusually fast or unusually slow memory systems might need to decrease or increase the value, respectively. If these systems provided an estimate of the relative speed of their respective memory systems, this estimate could be added to the numerator of the final calculation in rcu_sysidle_delay ( ).

4. The rcu_fanout_leaf term in rcu_sysidle_delay( ) is a proxy for the speed of the memory system, so if there was a direct estimate, it might be prudent to drop rcu_fanout_leaf from the calculation.

5. The calculations in rcu_sysidle_delay( ) assume a value of HZ of one or greater. Most systems are constrained such that this assumption will always be met, but other systems might need to split HZ into HZ_NUMERATOR and HZ_DENOMINATOR, the former multiplying into the calculation and the later dividing the calculation.

6. The calculations in rcu_sysidle_delay( ) assume that the effects of memory contention increase linearly with the number of CPUs, and the number of CPUs that the hardware can support (nr_cpu_ids) is multiplied into the expression. Systems in which memory contention varies non-linearly with the number of CPUs might need to substitute a appropriate non-linear function of nr_cpu_ids, for example, a system where contention varies as the square root of the number of CPUs should instead use sqrt (nr_cpu_ids).

7. Some applications might be able to tolerate timekeeping errors for some parts of their processing. Such applications might wish to designate multiple timekeeping CPUs, and run their timekeeping-error-tolerant processing on those CPUs. Full-system-idle state would be entered when all of the non-timekeeping CPUs were idle for a sufficiently long period of time, so that the comparisons for equality to tick_do_timer_cpu would change to set-membership operations.

Accordingly, a technique for detecting full-system idle state in adaptive tick kernels has been disclosed. It will be appreciated that the foregoing concepts may be variously embodied in any of a data processing system, a machine implemented method, and a computer program product in which programming logic is provided by one or more machine-readable non-transitory data storage media for use in controlling a data processing system to perform the required functions. Example embodiments of a data processing system and machine implemented method were previously described in connection with FIG. 1-8.

Figure 9:
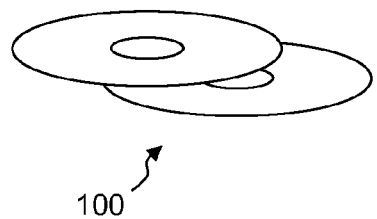
FIG. 9 is a diagrammatic illustration showing an example computer-readable data storage medium that may be used to provide a computer program product in accordance with the present disclosure.

The computer program product may include a computer readable storage medium (or media) having computer readable program instructions thereon for causing a processor to carry out aspects of the present invention. Example computer readable storage media for storing such program instructions are shown by reference numerals 8 (memory) and 10 (cache) of the computer system 2 of FIG. 4. The system 2 may further include one or more secondary (or tertiary) storage devices (not shown) that could store the program instructions between system reboots. A further example of a computer readable storage medium that may be used to store the program instructions is shown by reference numeral 100 in FIG. 9. The computer readable storage medium 100 is illustrated as being one or more portable optical storage disks of the type that are conventionally used for commercial software sales, such as compact disk-read only memory (CD-ROM) disks, compact disk-read/write (CD-R/W) disks, and digital versatile disks (DVDs).

The computer readable storage medium can thus be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. In a computer system having plural CPUs, including a timekeeping CPU and one or more non-timekeeping CPUs, operatively coupled to one or more memory devices, said system running an adaptive tick kernel, a method for detecting full-system idle state in said adaptive-tick kernel, the method comprising:
   detecting a non-timekeeping CPU idle state;
   initiating a hysteresis period;
   waiting for said hysteresis period to end;
   manipulating a data structure whose state indicates whether a scheduling clock tick may be disabled on all of said CPUs; and
   disabling said scheduling clock tick on all of said CPUs if said data structure is determined to be in an appropriate state,
   wherein:
   said detecting a non-timekeeping CPU idle state comprises said timekeeping CPU detecting that all said non-timekeeping CPUs are in said idle state;
   said initiating a hysteresis period and said waiting for said hysteresis period to end use a global state variable that indicates whether or not all of said non-timekeeping CPUs are in an idle state, and if so, for how long;
   said global state variable being configured to store a first state indicating that at least one non-timekeeping CPU is in a non-idle state, a second state indicating that all of said non-timekeeping CPUs have been in an idle state for a relatively short time period, a third state indicating that all of said non-timekeeping CPUs have been in an idle state long enough that said global state variable may be changed without danger of excessive memory contention, a fourth state indicating that all of said non-timekeeping CPUs have been in an idle state long enough to warrant turning off said scheduling clock tick, and a fifth state indicating that said timekeeping CPU has noted said fourth state and turned off said scheduling clock tick on all of said CPUs;
   said initiating a hysteresis period comprises first and second hysteresis initiating operations;
   said waiting for said hysteresis period to end comprises first and second hysteresis period waiting operations;
   said first hysteresis initiating operation comprises said timekeeping CPU transitioning said global state variable from said first state to said second state, and performing a calculation to determine a first delay period for transition of said global state variable from said second state to said third state;
   said first hysteresis period waiting operation comprises said timekeeping CPU waiting until said first delay period has elapsed;
   said second hysteresis initiating operation comprises said timekeeping CPU transitioning said global state variable from said second state to said third second state, and performing a calculation to determine a second delay period for transition of said global state variable from said third state to said fourth state;
   said second hysteresis period waiting operation comprises said timekeeping CPU waiting until said second delay period has elapsed;
   said manipulating a data structure comprises said timekeeping CPU transitioning said global state variable from said third state to said fourth state after said second said delay period has elapsed;
   said disabling said scheduling clock tick on all of said CPUs is performed by said timekeeping CPU based on said global state variable being in said fourth state, and includes said timekeeping CPU transitioning said global state variable from said fourth state to said fifth state, then disabling the scheduling clock tick.

2. The method of claim 1, wherein said global state variable is maintained as part of a Read-Copy Update (RCU) dyntick-idle subsystem, and state transitions of said global state variable between said first state, said second state and said third state are performed by an RCU grace period tracking kthread running on said timekeeping CPU.

3. The method of claim 2, wherein said non-timekeeping CPUs record their entry into idle state using a per-CPU idle state variable, and said RCU dyntick-idle subsystem checks said per-CPU idle state variables and transitions said global state variable from said first state to said second state if each non-timekeeping CPU has set its per-CPU idle state variable to indicate said idle state.

4. The method of claim 1, wherein said calculations to determine said first and second delay periods are based on a number of said CPUs, and if said number of CPUs exceeds a threshold, a rate of said scheduling clock tick and an RCU leaf fanout size.

5. The method of claim 1, wherein said scheduling clock tick is restored by one of said non-timekeeping CPUs awakening out of its idle state, checking said global state variable, transitioning said global state variable to said first state if it was in any of said third through fifth states, and sending an inter-processor interrupt to said timekeeping CPU if said global state variable is in said fifth state.

6. A system comprising:
   plural CPUs, including a timekeeping CPU and one or more non-timekeeping CPUs; and
   one or more memory devices coupled to said CPUs, said memory devices including a computer readable storage medium tangibly embodying at least one program of instructions executable by said CPUs to implement an adaptive tick kernel, and operations for detecting full-system idle state in said adaptive-tick kernel, said operations comprising detecting a non-timekeeping CPU idle state, initiating a hysteresis period, waiting for said hysteresis period to end, manipulating a data structure whose state indicates whether a scheduling clock tick may be disabled on all of said CPUs, and disabling said scheduling clock tick on all of said CPUs if said data structure is determined to be in an appropriate state, wherein:

said detecting a non-timekeeping CPU idle state comprises said timekeeping CPU detecting that all said non-timekeeping CPUs are in said idle state;

said initiating a hysteresis period and said waiting for said hysteresis period to end use a global state variable that indicates whether or not all of said non-timekeeping CPUs are in an idle state, and if so, for how long;

said global state variable being configured to store a first state indicating that at least one non-timekeeping CPU is in a non-idle state, a second state indicating that all of said non-timekeeping CPUs have been in an idle state for a relatively short time period, a third state indicating that all of said non-timekeeping CPUs have been in an idle state long enough that said global state variable may be changed without danger of excessive memory contention, a fourth state indicating that all of said non-timekeeping CPUs have been in an idle state long enough to warrant turning off said scheduling clock tick, and a fifth state indicating that said timekeeping CPU has noted said fourth state and turned off said scheduling clock tick on all of said CPUs;

said initiating a hysteresis period comprises first and second hysteresis initiating operations;

said waiting for said hysteresis period to end comprises first and second hysteresis period waiting operations;

said first hysteresis initiating operation comprises said timekeeping CPU transitioning said global state variable from said first state to said second state, and performing a calculation to determine a first delay period for transition of said global state variable from said second state to said third state;

said first hysteresis period waiting operation comprises said timekeeping CPU waiting until said first delay period has elapsed;

said second hysteresis initiating operation comprises said timekeeping CPU transitioning said global state variable from said second state to said third second state, and performing a calculation to determine a second delay period for transition of said global state variable from said third state to said fourth state;

said second hysteresis period waiting operation comprises said timekeeping CPU waiting until said second delay period has elapsed;

said manipulating a data structure comprises said timekeeping CPU transitioning said global state variable from said third state to said fourth state after said second said delay period has elapsed;

said disabling said scheduling clock tick on all of said CPUs is performed by said timekeeping CPU based on said global state variable being in said fourth state, and includes said timekeeping CPU transitioning said global state variable from said fourth state to said fifth state, then disabling the scheduling clock tick.

7. The system of claim 6, wherein said global state variable is maintained as part of a Read-Copy Update (RCU) dyntick-idle subsystem, and state transitions of said global state variable between said first state, said second state and said third state are performed by an RCU grace period tracking kthread running on said timekeeping CPU.

8. The system of claim 7, wherein said non-timekeeping CPUs record their entry into idle state using a per-CPU idle state variable, and said RCU dyntick-idle subsystem checks said per-CPU idle state variables and transitions said global state variable from said first state to said second state if each non-timekeeping CPU has set its per-CPU idle state variable to indicate said idle state.

9. The system of claim 6, wherein said calculations to determine said first and second delay periods are based on a number of said CPUs, and if said number of CPUs exceeds a threshold, a rate of said scheduling clock tick and an RCU leaf fanout size.

10. The system of claim 6, wherein said scheduling clock tick is restored by one of said non-timekeeping CPUs awakening out of its idle state, checking said global state variable, transitioning said global state variable to said first state if it was in any of said third through fifth states, and sending an inter-processor interrupt to said timekeeping CPU if said global state variable is in said fifth state.

11. A computer program product comprising:

one or more computer readable storage medium; and non-transitory program instructions provided by said one or more computer readable storage medium for programming a data processing platform to implement an adaptive tick kernel, and operations for detecting full-system idle state in said adaptive-tick kernel, said operations comprising detecting a non-timekeeping CPU idle state, initiating a hysteresis period, waiting for said hysteresis period to end, manipulating a data structure whose state indicates whether a scheduling clock tick may be disabled on all of said CPUs, and disabling said scheduling clock tick on all of said CPUs if said data structure is determined to be in an appropriate state, wherein:

said detecting a non-timekeeping CPU idle state comprises said timekeeping CPU detecting that all said non-timekeeping CPUs are in said idle state;

said initiating a hysteresis period and said waiting for said hysteresis period to end use a global state variable that indicates whether or not all of said non-timekeeping CPUs are in an idle state, and if so, for how long;

said global state variable being configured to store a first state indicating that at least one non-timekeeping CPU is in a non-idle state, a second state indicating that all of said non-timekeeping CPUs have been in an idle state for a relatively short time period, a third state indicating that all of said non-timekeeping CPUs have been in an idle state long enough that said global state variable may be changed without danger of excessive memory contention, a fourth state indicating that all of said non-timekeeping CPUs have been in an idle state long enough to warrant turning off said scheduling clock tick, and a fifth state indicating that said timekeeping CPU has noted said fourth state and turned off said scheduling clock tick on all of said CPUs;

said initiating a hysteresis period comprises first and second hysteresis initiating operations;

said waiting for said hysteresis period to end comprises first and second hysteresis period waiting operations;

said first hysteresis initiating operation comprises said timekeeping CPU transitioning said global state variable from said first state to said second state, and performing a calculation to determine a first delay period for transition of said global state variable from said second state to said third state;

said first hysteresis period waiting operation comprises said timekeeping CPU waiting until said first delay period has elapsed;

said second hysteresis initiating operation comprises said timekeeping CPU transitioning said global state variable from said second state to said third second state, and performing a calculation to determine a second delay period for transition of said global state variable from said third state to said fourth state;

said second hysteresis period waiting operation comprises said timekeeping CPU waiting until said second delay period has elapsed;

said manipulating a data structure comprises said timekeeping CPU transitioning said global state variable from said third state to said fourth state after said second said delay period has elapsed;

said disabling said scheduling clock tick on all of said CPUs is performed by said timekeeping CPU based on said global state variable being in said fourth state, and includes said timekeeping CPU transitioning said global state variable from fourth state to said fifth state, then disabling the scheduling clock tick.

12. The computer program product of claim 11, wherein said global state variable is maintained as part of a Read-Copy Update (RCU) dyntick-idle subsystem, and state transitions of said global state variable between said first state, said second state and said third state are performed by an RCU grace period tracking kthread running on said timekeeping CPU.

13. The computer program product of claim 12, wherein said non-timekeeping CPUs record their entry into idle state using a per-CPU idle state variable, and said RCU dyntick-idle subsystem checks said per-CPU idle state variables and transitions said global state variable from said first state to said second state if each non-timekeeping CPU has set its per-CPU idle state variable to indicate said idle state.

14. The computer program product of claim 11, wherein said calculations to determine said first and second delay periods are based on a number of said CPUs, and if said number of CPUs exceeds a threshold, a rate of said scheduling clock tick and an RCU leaf fanout size.

15. The computer program product of claim 11, wherein said scheduling clock tick is restored by one of said non-timekeeping CPUs awakening out of its idle state, checking said global state variable, transitioning said global state variable to said first state if it was in any of said third through fifth states, and sending an inter-processor interrupt to said timekeeping CPU if said global state variable is in said fifth state.

* * * * *